Jan. 14, 1941.                       C. C. COONS                       2,228,343
                          CONTROL FOR REFRIGERATING SYSTEMS
                        Filed June 16, 1937         3 Sheets-Sheet 1

INVENTOR
Curtis C. Coons
BY
Harry S. Demarse
ATTORNEY

Jan. 14, 1941.                    C. C. COONS                    2,228,343
                        CONTROL FOR REFRIGERATING SYSTEMS
                Filed June 16, 1937              3 Sheets-Sheet 2

INVENTOR
Curtis C. Coons
BY
Harry S. Dumarr
ATTORNEY

Jan. 14, 1941.   C. C. COONS   2,228,343
CONTROL FOR REFRIGERATING SYSTEMS
Filed June 16, 1937   3 Sheets-Sheet 3

INVENTOR
*Curtis C. Coons*

BY *Harry S. Dumars*

ATTORNEY

Patented Jan. 14, 1941

2,228,343

UNITED STATES PATENT OFFICE 2,228,343

CONTROL FOR REFRIGERATING SYSTEMS

Curtis C. Coons, North Canton, Ohio, assignor to The Hoover Company, North Canton, Ohio, a corporation of Ohio Application June 16, 1937, Serial No. 148,424

26 Claims. (Cl. 62—5)

This invention relates to absorption refrigeration systems and more particularly to electrical and mechanical control apparatus for said systems. Absorption refrigerating systems operated by heat and an electrical motor or the like for circulating inert gas therein are well-known. It has been proposed to provide such a system with a heater for the boiler operated by gas or the like and to provide an electrical motor for driving a fan or other device for circulating the inert gas between the evaporator and the absorber.

It is an object of the present invention to provide a novel control means for an absorption refrigerating system which will insure proper operation of the system at all times.

It is a further object of the invention to provide a novel control system for an absorption refrigerating system of the type above referred to which will positively insure proper synchronization, at all times, between the operation of the gas burner and the electrical motor driving the inert gas fan.

It is a further object of the invention to provide a simple and convenient arrangement of the control for the gas valve and electric motor of an absorption refrigerating system.

It is a further object of the invention to provide a control system for the gas burner and electrical motor controlled by a single dial.

It is a further object of the invention to provide a control system of the type referred to wherein a single thermally responsive element controls both the gas valve and the electrical motor.

It is an object of one form of the invention so to relate the controls for the gas valve and electric motor that they are operated on and off simultaneously.

It is an object of another form of the invention so to relate the controls for the gas valve and electric motor that the action of the switch controlling the electric motor is delayed with respect to the action of the gas valve.

Other objects and advantages resident in the novel arrangement of parts and constructional features will be apparent from the following description taken in connection with the accompanying drawings in which.

Figure 1:
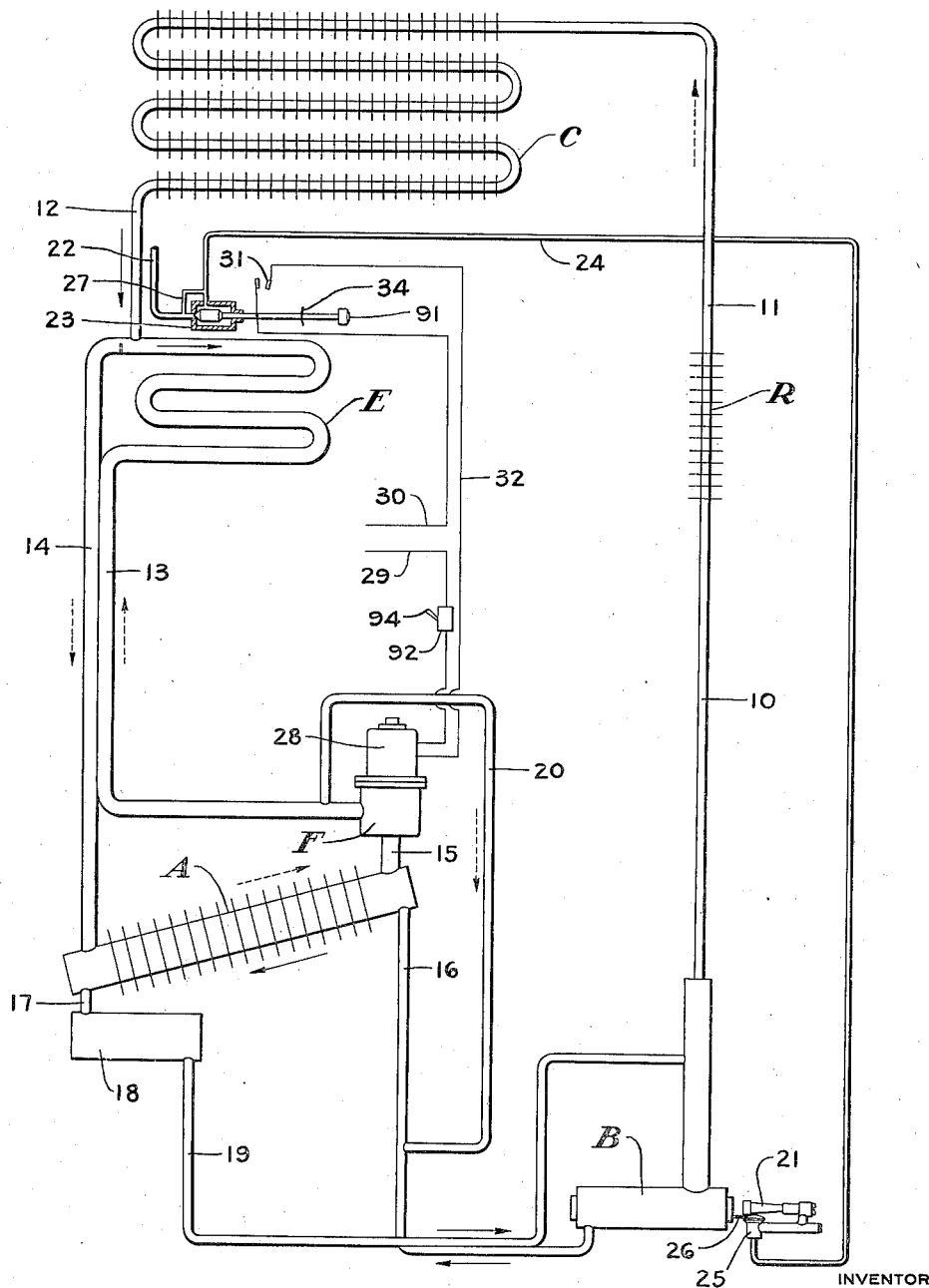
Figure 1 is a diagrammatic representation of an absorption refrigerating system using inert gas and having a gas circulating fan driven by electric motor. The diagram also illustrates diagrammatically the control apparatus for the system.

Referring to the drawings in detail and first to Figure 1 thereof, it will be apparent that an absorption refrigerating system is illustrated comprising a boiler B, a rectifier R, a condenser C, an evaporator E, an inert gas circulating fan F, and an absorber A. These elements are connected by various pipes to form a continuous absorption refrigerating system. Pipe 10 conveys vapor from the boiler to the rectifier R wherein entrained water vapor is condensed and returned by gravity to the boiler B. From the rectifier R a pipe 11 conveys ammonia vapor to the condenser C wherein it is liquefied and discharged through the pipe 12 into the evaporator E. An inert gas, such as nitrogen is conveyed from the fan F by means of a conduit 13 into the evaporator E wherein the liquid refrigerant discharged from the pipe 12 vaporizes into the inert gas to form a mixture of inert gas and vaporized refrigerant which is discharged from the evaporator into the lower part of the absorber A through pipe 14. In the absorber A the refrigerant vapor contained in the gas mixture discharged thereinto from pipe 14 is absorbed by absorption liquid and the inert gas returns to fan F through conduit 15. After the ammonia contained in the solution in boiler B has been vaporized the weak absorption liquid is conveyed to the absorber A by means of conduit 16. The strong solution discharged from the absorber A through conduit 17 collects in a collecting vessel 18 and is returned therefrom to the boiler B through the conduit 19. In order that absorption liquid may be lifted from the level of the boiler to the top of the absorber a portion of the inert gas discharged by the circulating fan F is conveyed by means of conduit 20 to a portion of conduit 16 well below the free surface of the liquid in the boiler in order that the absorption liquid may be elevated to the upper end of the absorber by gas lift action. Conduits 13 and 14 forming part of the inert gas circulating system are in heat exchange relation. Likewise conduits 16 and 19 forming part of the absorption liquid circuit are in heat exchange relation.

A gas burner 21 is mounted on the apparatus in position to heat the boiler B in any suitable manner. Fuel is supplied from a suitable source through a conduit 22, valve 23, a conduit 24 and a safety cut-off valve 25. Safety cut-off valve 25 which is provided with a thermostat 26 positioned to be heated by the burner flame, prevents the supply of gas to the burner when an igniting flame is not adjacent thereto. The usual bypass 27 is provided around the valve 23 to provide an igniting flame on the burner. If desired the pilot or igniting flame could be provided by a separate small burner connected to the gas line ahead of the valve 23; in this event the safety cut-off valve would be in the line 22 ahead of the small burner connection.

Circulating fan F is driven by an electric motor 28. Electrical energy is supplied to motor 28 by means of supply wires 29 and 30. Wire 29 leads directly to the motor 28 through the defrosting switch 92. Wire 30 leads to a switch 31 which is connected to the motor by means of a wire 32.

Gas valve 23 and electric switch 31 are actuated by a thermal snap acting disc 34 positioned to be responsive to evaporator temperature.

Figure 2:
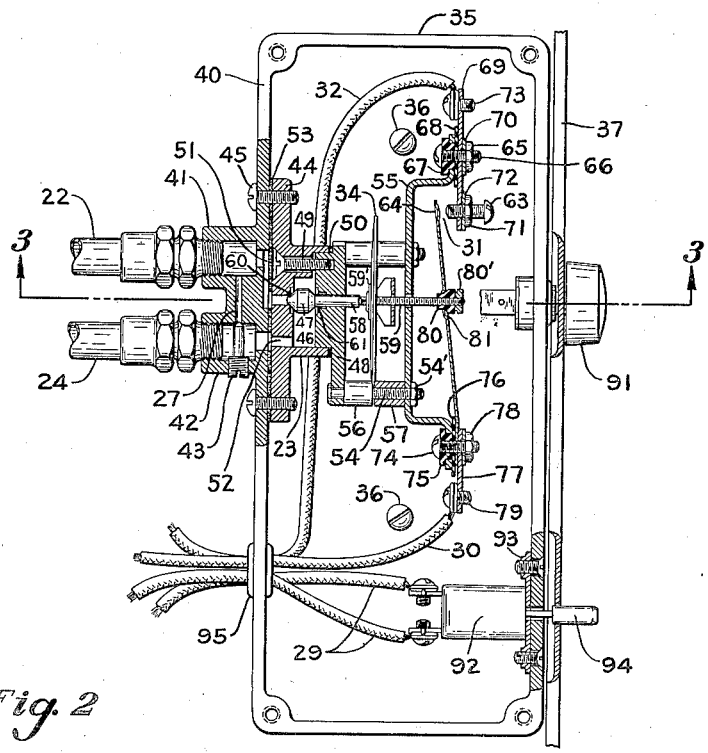
Figure 2 is a top plan view of the controlling mechanism of one form of the invention.
Figure 3:
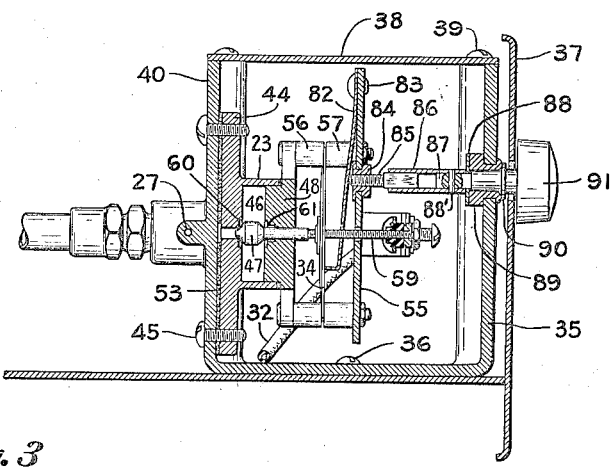
Figure 3 is a cross sectional view of the mechanism of Figure 2 taken on the line 3—3 of Figure 2.

Referring to Figures 2 and 3, it will be seen that the control mechanism is inclosed within a housing 35 rigidly secured to the top forward portion of the evaporator by means of bolts 36. Housing 35 is positioned just to the rear of a control panel 37 extending upwardly above the front portion of the evaporator. The open top of housing 35 is closed by means of a flat plate 38 secured thereto at its corner by bolts 39. The rear wall 40 of housing 35 is provided with a pair of rearwardly projecting connecting nipples 41 and 42 connected respectively to gas pipes 22 and 24. By-pass pipe 27 is formed in the projecting nipple members 41 and 42 and is regulated by a needle valve 43. A valve housing 44 of the valve 23 is secured to the inside of wall 40 opposite nipples 41 and 42 by means of bolts 45.

Valve housing 44 is formed with a valve chamber 46 enclosing a valve plug 47. Chamber 46 is closed by a closure plate 48 secured thereto by bolts 49 passing through member 44. A plurality of shim washers 50 are interposed between the members 44 and 48 to seal the valve chamber 46 and to provide a means for adjusting the valve opening. Nipples 41 and 42 are connected with the interior of valve chamber 46 by means of passages 51 and 52 respectively. A packing material 53 is interposed between member 44 and wall 40 in order to seal passages 51 and 52.

Closure plate 48 is provided with a plurality of projecting studs 54 carrying at their outer ends a switch bracket 55. Spacing collars 56 and 57 are mounted on studs 54 and serve to clamp bimetallic snap acting disc 34 therebetween. The elements 48, 55, 56 and 57 are clamped together by nuts 54' on bolts 54.

Valve plug element 47 is provided with a projecting portion 58 extending through enclosure element 48 and connected to thermostatic element 34 by means of an adjusting screw 59, which is threadedly engaged in a collar 59' rigidly attached to disc 34. Valve plug member 47 in one extreme position of its movement contacts a valve seat 60 to shut off the gas supply to the gas burner, and in its other extreme position of movement valve plug 47 contacts a valve seat 61 to prevent gas leakage along extension 58.

Bracket member 55 is generally U-shaped in cross section and forms the mounting for the switch 31. Switch 31 comprises a stationary contact 63 and a movable contact 64. Stationary contact 63 is mounted on a contact plate 69 attached to bracket 55 by means of nut and bolt 65 and 66. Supporting bolt 65 passes through an insulating collar 67 mounted in an extending portion of bracket 55. An insulating plate 68 is interposed between contact strip 69 and bracket 55. A lock washer 70 is interposed between contact strip 69 and nut 65 on bolt 66. Contact screw 63 has threaded engagement with contact strip 69 and is rigidly connected thereto by means of lock nut 71 and lock washer 72. The end of contact strip 69 remote from contact 63 is connected to wire 32 by means of bolt 73.

Movable contact 64 is made of spring material and is normally urged toward circuit closing position. The fixed end of contact 64 is rigidly attached to supporting bracket 55 by means of a bolt 74 passing through an insulating collar 75 mounted in bracket 55. Contact 64 is spaced and insulated from bracket 55 by means of an insulating plate 76 through which bolt 74 extends. A contact plate 77 is also mounted on bolt 74. The elements 64, 74, 75, 76 and 77 are rigidly connected together and to the supporting bracket 55 by means of nut 78. Current supply wire 30 is connected to contact plate 77 by means of screw connector 79.

Movable contact element 64 is adjustably connected to snap acting thermostatic disc 34 by means of an extension of screw 59. Adjusting screw 59 carries an adjustable insulating block 80, which is locked in adjusted position on screw 59 by means of a lock nut 80', on the free end thereof which bears in a cupped opening 81 in contact strip 64 in order to move the contact to open position. The contact is moved to closed position by its own spring bias.

Adjustment of the temperature range of the gas valve and electric switch in moving from "on" position to "off" position or vice versa is secured by an adjustable pressure member 82 which is constructed of spring material and is rigidly secured to bracket 55 by means of a rivet 83. The free end of pressure member 82 is turned at right angles to the body of said member and bears upon the surface of bimetallic disc 34. In order to vary the pressure exerted on disc 34 by pressure member 82, a collar 84 is rigidly attached to bracket 55 and screw threadedly receives an adjusting plug 85 which bears on pressure member 84 at a point intermediate the fixed and free ends thereof. The end of the member 85 remote from pressure member 82 is squared and is slidably received in a square collar 86 which is non-rotatably attached to a control dial shaft 87 by means of a pin 88'. Collar member 86 bears on a washer member 88 attached to a reduced portion of shaft 87 to prevent outward movement of shaft 87. Washer 88 bears on a collar 89 surrounding shaft 87 and rigidly attached to the front wall of housing member 35. A collar member 90 is rigidly attached to shaft 87 and bears on the outer end of collar 89 to prevent inward movement of shaft 87. Shaft 87 extends through an opening formed in control panel 37 and carries a controlling dial 91 on the outer end thereof.

In order to stop the operation of the circulating fan during defrosting operation, a snap-acting manual switch 92 is mounted on the front wall of housing 35 by means of a bracket plate and screws 93. The actuating handle 94 of switch 92 extends through slots formed in the front wall of housing 35 and in the control panel 37. Switch 92 is interposed between the supply line 29 and the inert gas fan motor 28. The wires 29, 30 and 32 are led out of the housing 35 through an insulating grommet 95 mounted in rear wall 40.

In this form of the invention initial adjustment of the valve 47 is made by adding or subtracting shim washers 50 to the space between the elements 44 and 48. The movable contact 64 of the switch is adjusted by changing the position of insulating actuating collar 80 on the shaft 59.

The operation of this form of the invention is as follows: Control dial 91 is settable to produce any desired average temperature in the evaporator. When the temperature of the evaporator rises above a predetermined value, bimetallic disc 34 becomes stressed and eventually snaps over center against the resistance of pressure member 82 and simultaneously opens valve port 60, and closes the contact of switch 31 thereby setting the gas burner in operation to produce refrigerant vapor and setting the inert gas circulating fan in operation to circulate the fluid in the inert gas and absorption liquid circuits. After a certain length of time the temperature of the evaporator will drop below another predetermined point at which time bimetallic disc 34 will be snapped in the opposite direction and will snap valve 60 into closed position and open the contacts of switch 31, thereby placing the system out of operation. Increasing the pressure applied to the bimetallic disc 34 by the pressure member 82 raises the effective temperature maintained in the evaporator. Decreasing the effective pressure of member 82 on bimetallic disc 34 lowers the effective temperature maintained in the evaporator.

Defrosting may be accomplished by opening the circuit to the circulating motor by means of manual switch 92, thus preventing circulation of the inert gas and as a consequence thereof evaporation of refrigerant liquid in the evaporator. As a result of this action, the temperature of the evaporator eventually rises sufficiently high to melt frost accumulated thereon. After the frost has been melted, switch 92 may be closed and normal operation of the system resumed. During the defrosting period the gas valve may or may not be open. If the gas valve is open, warm liquid refrigerant will be discharged from the condenser into the evaporator and will hasten the defrosting process.

As an alternate method of defrosting, switch 92 may be eliminated and dial 91 turned to such an extent that the pressure exerted on bimetallic snap disc 34 by pressure member 82 is so great that it prevents opening of valve 60 and closing of switch 31.

The control mechanism thus described is simple and sure in operation and it provides for absolute synchronization between the action of the gas valve and the inert gas circulating fan.

Figure 4:
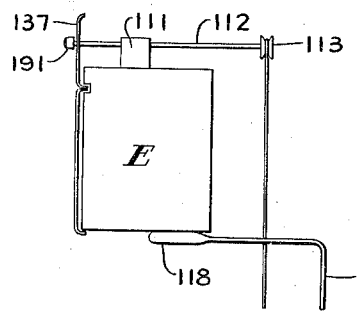
Figure 4 is a diagrammatic view of another form of the invention.
Figure 4:
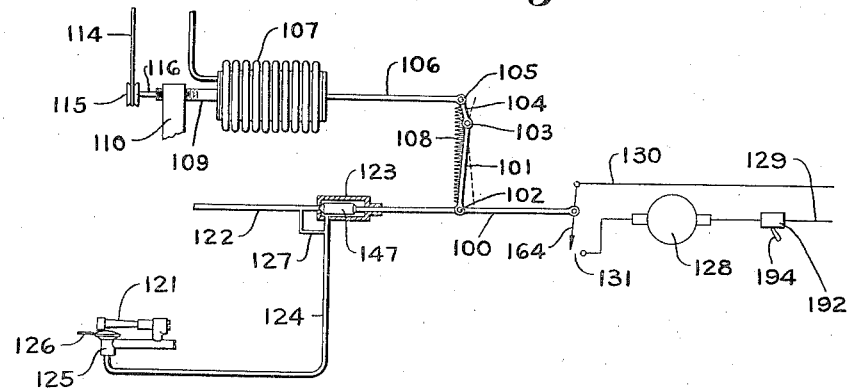

Figure 4 illustrates a modification of the invention wherein the gas valve and electric switch are simultaneously actuated by a bellows responsive to evaporator temperature through the medium of a snap-acting toggle mechanism. In this form of the invention the plug 147 of the valve 123 and the movable contact 164 of the switch 131 are rigidly connected together by means of an arm 100. Arm 100 is pivotally connected to a snap link 101 at 102. Link 101 is pivotally mounted at 103 on a fixed pivot pin. An actuating link 104 is pivotally mounted on pin 103 and is pivotally connected at 105 to an actuating lever 106 rigidly attached to a bellows 107. Snap spring 108 is connected to the pivots 102 and 105.

The end of the bellows opposite to the snap-acting mechanism is rotatably mounted on a rigid rearwardly projecting threaded adjusting member 109 which is screw threadedly mounted in a rigid support 110 attached to any convenient part of the refrigerating cabinet or framework mechanism. The evaporator E is provided with a forward upwardly extending control panel 137 and on its top mounts a supporting block 111 through which extends the controlling shaft 112 of the control mechanism. The forward end of shaft 112 is provided with an actuating dial 191 and its rear end carries a drive pulley 113 around which is trained a flexible cable 114 which also extends around a drive pulley 115 on an extending portion 116 of adjusting bolt 109.

The flexible bellows 107 is in open communication with one end of a small hollow tube 117 which communicates at its opposite end with a bulb element 118 containing an expansible fluid and positioned in thermal contact with the wall of the evaporator E.

The gas supply and burner system 121, 122, 123, 124, 125, 126 and 127 corresponds to the system 21, 22, 23, 24, 25, 26, and 27 of Figure 1, respectively.

The electrical system 128, 129, 130, 131, 164, 192, and 194 corresponds to the system 28, 29, 30, 31, 64, 92, and 94 of Figures 1 and 2 respectively.

This form of the invention operates in the same manner as the form disclosed in Figures 1 to 3. The bellows 107 expands and contracts in response to changes in pressure of the fluid therein contained induced by temperature changes in the evaporator E and transmitted to the bellows from the bulb element 118 by conduit 117. Expansion and contraction of bellows 107 moves the snap actuating link 104 between the full and dotted line positions shown in the drawings. The movement of link 104 to the dotted line position of the drawings swings spring 108 across the center of pivot 103 causing the valve plug 147 to snap to open position and the movable contact 164 of switch 131 to snap to closed position thus placing a full flame on the burner and starting the circulating fan motor. Movement of dial 191, through the medium of threaded stud 109, advances or retracts the expansible bellows 107 to change its position relative to the snap mechanism to thereby change the temperatures at which the bellows 107 opens and closes the valve and switch.

Defrosting may be accomplished by opening switch 192 or by retracting bellows 107 to such an extent that it is unable to expand sufficiently to open the valve and close the switch.

Figure 5:
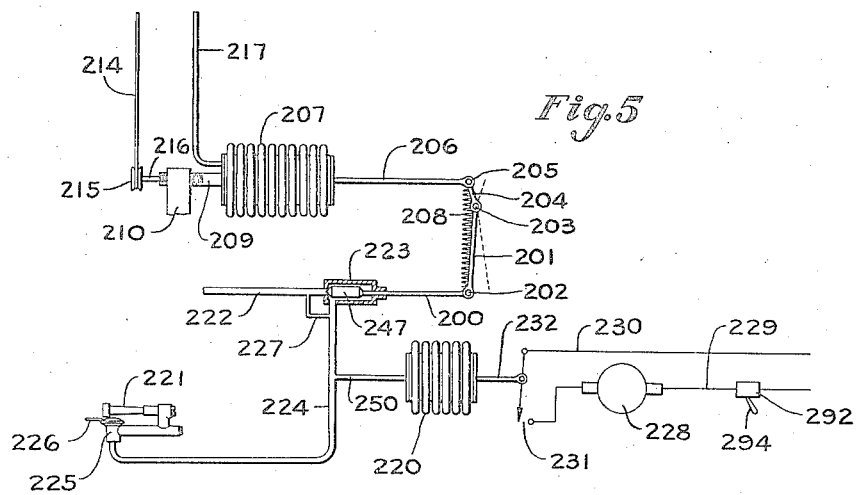
Figure 5 is a diagrammatic view of a third form of the invention.

Figure 5 illustrates a third modification of the invention wherein the switch for controlling the inert gas circulating fan motor is actuated in response to gas pressure rather than by means of a direct mechanical connection between the switch and the thermally responsive element.

In this form of the invention, the evaporator, control valve, and thermal bulb arrangement are identical with that shown in Figure 4. The bellows 207 operates to open and close the gas valve plug 247 with a snap motion by means of the linkage mechanism 201 to 206, inclusive, and 208 which is similar to the mechanism 101 to 106, inclusive, and 108 described in connection with Figure 4. The arm 200 acts only on the gas valve plug 247.

The switch 231 which controls the inert gas circulating fan motor 228 is actuated by means of an expansible bellows 220 through the medium of a link 232. The switch 231 is preferably of the snap acting variety. Bellows 220 is connected to the gas supply line between the control valve and gas burner by means of a small pipe 250.

The parts 221 to 230, inclusive, 247, 292 and 294 correspond respectively to the parts 21 to 30, inclusive, 47, 92, and 94 described in connection with Figures 1 and 2. The parts 210, 214 to 217, inclusive, and 209 correspond respectively to the parts 110, 114 to 117, inclusive, and 109 described in connection with Figure 4.

In the operation of this form of the invention, the position of the bellows 207 is adjusted by means of a dial operatively connected to the cable 214 to shift the position of the bellows relative to the snap mechanism. Expansion and contraction of the bellows in response to changes in the evaporator temperature actuates the gas valve plug 247 to open and closed positions to control the gas burner. When the valve plug 247 is snapped to open position, the burner will immediately increase from a pilot to a full flame operation. The pressure of the gas in pipe 224 passing through burner 221 is transmitted to bellows 220 through the restricted pipe 250. As the gas pressure is transmitted from pipe 224 through pipe 250 into bellows 220, bellows 220 expands and closes switch 231 to place the inert gas circulating fan motor 228 in operation. The gas pressure in conduit 224 due to the pilot by-pass 227 is insufficient to actuate bellows 220. Due to the restricted pipe 250, there is a definite lapse of time between full flame operation of the burner and initiation of operation of the motor 228; likewise when the gas burner control valve plug 247 is snapped to closed position, there is a lag between the times at which the burner returns to a mere pilot flame and the time at which switch 231 is open to stop operation of motor 228.

In the operation of this form of the device a slight time lag is provided in order to allow the burner to assume full flame operation and to begin vaporization of refrigerant vapor from the solution contained in the boiler before the time at which the circulating fan is placed in operation; and it also provides a definite time lag between the periods of burner shut-off and motor shut-off.

Normal control and defrosting are accomplished in the manner described in connection with the modification of Figure 4.

This system is advantageous due to the fact that the inert gas and absorption liquid are not circulated unnecessarily immediately the system is put into operation but are delayed a slight period to allow the burner to drive off some refrigerent vapor to the condenser and to thus weaken the absorption solution in the boiler adjacent the absorber return line 16. Likewise, when the gas burner is shut off, there will be some refrigerant liquid collecting in the evaporator due to vapor driven off from the boiler just prior to burner shut-off and this vapor will be evaporated and conveyed to the absorber prior to shut-off of the inert gas circulating fan motor.

While I have illustrated and described several embodiments of my invention, it is to be understood that these are to be taken as illustrative only and not in a limiting sense. I do not wish to be limited to the precise structure shown but to include all equivalent variations thereof except as limited by the scope of the appended claims.

I claim:

1. The method of maintaining a space to be refrigerated between predetermined lower and upper temperature limits which comprises the steps of generating a refrigerant vapor from solution, liquefying the vapor so generated, evaporating the liquid refrigerant in the presence of an inert gas to produce refrigeration, absorbing the refrigerant vapor from the inert gas, circulating the inert gas by power means, circulating the absorption solution by introducing inert gas thereinto until the temperature of the space to be refrigerated reaches said lower predetermined temperature limit, and then discontinuing the generation of vapor and circulation of inert gas and absorption solution until the temperature of the space to be refrigerated reaches said predetermined upper temperature limit.

2. The method of controlling a refrigerating system of the pressure equalized type having a heat producing means to produce refrigerant vapor and power-driven means to circulate fluids in the system which comprises starting and stopping operation of the heat producing means in response to demand for refrigeration, and starting and stopping operation of said power-driven means in response to starting and stopping of the heat producing means but later in time.

3. In combination, a generator, a condenser, an evaporator, an absorber, connections forming a refrigerant circuit from the generator to the evaporator, connections forming an inert gas circuit between the evaporator and absorber, connections forming an absorbent circuit between the generator and absorber, a motor-driven fan for circulating inert gas, a bleed line from the inert gas circuit connected to circulate fluid in another circuit by gas lift action, a source of heat for the generator, a temperature responsive device positioned to be affected by the evaporator temperature, and means operated by said temperature responsive device controlling the operation of said motor-driven fan and said source of heat.

4. A control device for three fluid absorption refrigerating systems of the type utilizing a gas burner to heat a portion of the system and a motor-driven means to circulate fluid in the system, comprising a control housing mounted on the evaporator, a snap-acting temperature responsive disc rigidly supported at its edges in the housing, switch means in the housing connected to control said motor-driven means, a gas valve in said housing connected to control operation of said gas burner, and means connecting said switch and said gas valve to said disc for simultaneous operation.

5. A control device for three fluid absorption refrigerating systems of the type utilizing a gas burner to heat a portion of the system and a motor-driven means to circulate fluid in the system, comprising a control housing mounted on the evaporator, a snap-acting temperature responsive disc rigidly supported at its edges in the housing, switch means in the housing connected to control said motor-driven means, a gas valve in said housing connected to control operation of said gas burner, means connecting said switch and said gas valve to said disc for simultaneous operation, resilient means bearing on one face of said disc, and adjustable means bearing on said resilient means whereby the operating temperatures of said disc may be varied.

6. A control device for three fluid absorption refrigerating systems of the type utilizing a gas burner to heat a portion of the system and a motor-driven means to circulate fluid in the system, comprising a gas valve connected to control said gas burner, a switch connected to control said motor, an expansible bellows device connected to be responsive to demand for refrigeration, a snap-acting toggle mechanism connected to be operated by said bellows, and means connecting said snap-acting toggle mechanism to said gas valve and said switch for simultaneous operation.

7. A control device for three fluid absorption refrigerating systems of the type utilizing a gas burner to heat a portion of the system and a motor-driven means to circulate fluid in the system, comprising a gas valve connected to control said gas burner, a switch connected to control said motor, an expansible bellows device connected to be responsive to demand for refrigeration, a snap-acting toggle mechanism connected to be operated by said bellows, means connecting said snap-acting toggle mechanism to said gas valve and said switch for simultaneous operation, and means connected to adjust the operating temperatures of said bellows.

8. A control device for three fluid absorption refrigerating systems of the type utilizing a gas burner to heat a portion of the system and a motor-driven means to circulate fluid in the system, comprising a gas valve connected to control said gas burner, a switch connected to control said motor, an expansible bellows device connected to be responsive to demand for refrigeration, a snap-acting toggle mechanism connected to be operated by said bellows, means connecting said snap-acting toggle mechanism to said gas valve and said switch for simultaneous operation, means connected to adjust the operating temperatures of said bellows, and manually movable means mounted on said evaporator for controlling said adjusting means.

9. A control device for three fluid absorption refrigerating systems of the type utilizing a gas burner to heat a portion of the system and a motor-driven means to circulate fluid in the system, comprising a gas valve connected to control operation of said gas burner, a switch connected to control operation of said motor, an expansible bellows connected to be responsive to demands for refrigeration, a snap-acting mechanism connected to be operated by said bellows, means operably connecting said gas valve and snap-acting mechanism, and means responsive to opening of said gas valve operable to close said switch.

10. A control device for three fluid absorption refrigerating systems of the type utilizing a gas burner to heat a portion of the system and a motor-driven means to circulate fluid in the system, comprising a gas valve connected to control operation of said gas burner, a switch connected to control operation of said motor, an expansible bellows connected to be responsive to demands for refrigeration, a snap-acting mechanism connected to be operated by said bellows, means operably connecting said gas valve and snap-acting mechanism, means responsive to opening of said gas valve operable to close said switch, and means connected to adjust the operating temperatures of said bellows.

11. A control device for three fluid absorption refrigerating systems of the type utilizing a gas burner to heat a portion of the system and a motor-driven means to circulate fluid in the system, comprising a gas valve connected to control operation of said gas burner, a switch connected to control operation of said motor, an expansible bellows connected to be responsive to demands for refrigeration, a snap-acting mechanism connected to be operated by said bellows, means operably connecting said gas valve and snap-acting mechanism, means responsive to opening of said gas valve operable to close said switch, means connected to adjust the operating temperatures of said bellows, and manually movable means mounted on said evaporator for controlling said adjusting means.

12. In combination, a generator, a condenser, an evaporator, an absorber, connections forming a refrigerant circuit from the generator to the evaporator, connections forming an inert gas circuit between the evaporator and absorber, connections forming an absorbent circuit between the generator and absorber, a motor-driven fan for circulating inert gas, a bleed line from the inert gas circuit connected to circulate fluid in another circuit by gas-lift action, a source of heat for the generator, a temperature responsive device positioned to be affected by the evaporator temperature, means operated by said temperature responsive device controlling the operation of said motor-driven fan and said source of heat, and manually operated means connected to discontinue operation of said motor-driven fan independently of said temperature responsive device.

13. A refrigerating system including an evaporator, means to circulate fluids through the system including a motor and a gas burner, means for supplying gas to said burner, a valve controlling said supply means, a thermostat responsive to evaporator temperature connected to control said valve, a switch connected to control said motor, an expansible bellows connected to operate said switch, and means providing a restricted connection between said bellows and said gas supply line whereby said switch is operated whenever gas is supplied to said burner.

14. In combination with an absorption refrigerating system having a fuel burner adapted to heat a boiler, and a motor driven fan to circulate inert gas through a portion of said system, control mechanism comprising a temperature responsive element, a fuel supply valve controlling the operation of said burner, an electrical switch controlling said motor driven circulator, means under the control of said temperature responsive element for operating said valve and switch to opened or closed position for controlling the operation of said refrigerating system in accord with temperature conditions, and manually operable means for changing the temperature adjustment of said thermostatic element.

15. In combination with an absorption refrigerating system having a fuel burner adapted to heat a boiler, and a motor driven fan to circulate inert gas through a portion of said system, control mechanism comprising a temperature responsive disc, a fuel supply valve controlling the operation of said burner, an electrical switch controlling said motor driven circulator, means under the control of said temperature responsive disc for operating said valve and switch to opened or closed position for controlling the operation of said refrigerating system in accord with temperature conditions, and manually operable means for changing the temperature adjustment of said thermostatic disc.

16. In combination with an absorption refrigerating system having a fuel burner adapted to heat a boiler, and a motor driven fan to circulate inert gas through a portion of said system, control mechanism comprising a temperature responsive disc, a fuel supply valve controlling the operation of said burner, an electrical switch controlling said motor driven circulator, means under the control of said temperature responsive disc for operating said valve and switch to opened or closed position for controlling the operation of said refrigerating system in accord with temperature conditions, a resilient arm mounted with one end thereof adjacent said disc, and manually operable means for urging said arm against said disc at variable pressures.

17. In combination with an absorption refrigerating system having a fuel burner adapted to heat a boiler, and a motor driven fan to circulate inert gas through a portion of said system, control mechanism comprising a temperature responsive element, a fuel supply valve controlling the operation of said burner, an electrical switch controlling said motor driven circulator, means under the control of said temperature responsive element for operating said valve and switch to opened or closed position for controlling the operation of said refrigerating system in accord with temperature conditions, and manually operable means for changing the temperature adjustment of said thermostatic element, and a manually operable defrosting switch serially connected with said motor control switch.

18. A control device for three-fluid absorption refrigerating systems of the type utilizing a gas burner to heat a portion of the system and a motor-driven means to circulate fluid in the system, comprising a gas valve connected to control said gas burner, a switch connected to control said motor, thermostatic means arranged to be responsive to demand for refrigeration, a snap-acting toggle mechanism connected to be operated by said thermostatic means, means connecting said snap-acting toggle mechanism to said gas valve and said switch for simultaneous operation, and means connected to adjust the operating temperatures of said thermostatic means.

19. In combination with an absorption refrigerating system having a fuel burner adapted to heat a boiler, and a motor driven fan to circulate inert gas through a portion of said system, control mechanism comprising a temperature responsive element, a fuel supply valve controlling the operation of said burner adapted to reduce the flame thereon to an igniting flame, flame failure responsive means for completely stopping the supply of fuel to said burner, an electrical switch controlling said motor driven circulator, means under the control of said temperature responsive element for operating said valve and switch for regulating the operation of said refrigerating system in accord with temperature conditions, and manually operable means for changing the temperature adjustment of said thermostatic element.

20. Absorption refrigerating apparatus of the three-fluid type comprising a generator, an absorber, a condenser, an evaporator and a power operated fluid circulator connected in circuit, a heater for said generator, control means for rendering said heater operative and inoperative in response to refrigeration demands, and control means for said fluid circulator constructed and arranged to de-energize said fluid circulator in time delay relationship with de-energization of said heater.

21. That method of operating an absorption refrigerating apparatus having heating means for the boiler and means for circulating an inert pressure equalizing medium between the evaporator and absorber which comprises energizing the heating means responsive to a demand for refrigeration and delaying the operation of said inert medium circulating means until the boiler has reached an operating temperature.

22. That method of operating an absorption refrigerating apparatus having a heating means for the boiler, means for circulating the inert pressure equalizing medium between the evaporator and absorber, and means for circulating an absorbent between the boiler and absorber which comprises energizing the heating means responsive to a demand for refrigeration and delaying the operation of said inert medium circulating means and solution circulation means until the boiler has reached an operative temperature.

23. Absorption refrigerating apparatus including a boiler, a heater therefor, a fluid circulator, control means for rendering said heater operative or inoperative in accord with refrigerating demand, and means for rendering said fluid circulator operative or inoperative in time delay relationship with said heater.

24. Absorption refrigerating apparatus comprising a generator, a liquefier, an evaporator and a fluid circulator connected in circuit, a heater for said generator, means for governing the operation of said heater in response to refrigeration demand, and means for rendering said circulator operative after said generator has been heated sufficiently by said heater to expel refrigerant vapor and for rendering said circulator inoperative when said generator ceases to expel refrigerant vapor.

25. Absorption refrigerating apparatus comprising an inert gas circuit including an evaporator and an absorber, a solution circuit including a generator and said absorber, an electric motor driven fan in said inert gas circuit for propelling inert gas therethrough, a gas lift pump circulator in said solution circuit, means for supplying pumping gas from said inert gas circuit to said gas lift pump, a heater for said generator, control means for said heater, and means for rendering said fan operative after said generator has been heated sufficiently by said heater to expel refrigerant vapor and for rendering said fan inoperative when said boiler ceases to expel refrigerant vapor.

26. Absorption refrigerating apparatus comprising an inert gas circuit including an evaporator and an absorber, a solution circuit including a generator and said absorber, means for heating said generator, means for regulating the operation of said heating means in accord with the demand for refrigeration, and means set in operation after expulsion of refrigerant vapor from said generator has begun for circulating the inert gas and solution through said inert gas and solution circuits, respectively.

CURTIS C. COONS.